(12) United States Patent
Sugama

(10) Patent No.: US 9,479,286 B2
(45) Date of Patent: Oct. 25, 2016

(54) OPTICALLY INTERCONNECTED CHIP, METHOD OF TESTING THE SAME, AND OPTICAL RECEIVER

(71) Applicant: FUJITSU LIMITED, Kawasaki-shi, Kanagawa (JP)

(72) Inventor: Akio Sugama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/750,505

(22) Filed: Jun. 25, 2015

(65) Prior Publication Data
US 2015/0295675 A1    Oct. 15, 2015

Related U.S. Application Data

(63) Continuation of application No. PCT/JP2013/050817, filed on Jan. 17, 2013.

(51) Int. Cl.
| | |
|---|---|
| H04J 14/06 | (2006.01) |
| G02B 6/42 | (2006.01) |
| H04B 10/25 | (2013.01) |
| H04B 10/40 | (2013.01) |

(52) U.S. Cl.
CPC .............. *H04J 14/06* (2013.01); *G02B 6/42* (2013.01); *H04B 10/2504* (2013.01); *H04B 10/40* (2013.01)

(58) Field of Classification Search
CPC ...... G02B 6/126; G02B 6/105; G02B 6/272; G02B 6/2793; G02B 27/286; G02B 6/2766; G02B 6/43; G02F 1/093; G02F 1/011; G02F 1/095
USPC .......................................... 398/65
See application file for complete search history.

(56) References Cited

U.S. PATENT DOCUMENTS

| | | | | |
|---|---|---|---|---|
| 7,221,826 B2 * | 5/2007 | Hanashima | ........ | G02B 6/12007 |
| | | | | 385/129 |
| 8,547,630 B2 * | 10/2013 | Tanaka | ................. | G02B 6/4206 |
| | | | | 359/344 |

(Continued)

FOREIGN PATENT DOCUMENTS

| | | |
|---|---|---|
| JP | 04-097118 | 3/1992 |
| JP | 07-128532 | 5/1995 |

(Continued)

OTHER PUBLICATIONS

US 5,150,251, 9/1992, Tomita et al. (withdrawn).
Huang et al., "Realization of a Compact and Single-Mode Optical Passive Polarization Converter", IEEE Photonics Technology Letters, vol. 12, No. 3, Mar. 2000, pp. 317-319 (4 pages).
Watanabe et al., "Si wire waveguide devices", Proceedings of SPIE, vol. 6775, 67750K, Sep. 2007 (10 pages).

(Continued)

*Primary Examiner* — Don N Vo
(74) *Attorney, Agent, or Firm* — Fujitsu Patent Center

(57) ABSTRACT

An optically interconnected chip includes a first optical transmitter circuit, a first spot size converter connected by a first optical waveguide to the first optical transmitter circuit, a first optical receiver circuit, a second spot size converter connected by a second optical waveguide to the first optical receiver circuit, a rotator provided between the second spot size converter and the first optical receiver circuit and configured to rotate a direction of polarization of light propagating through the second optical waveguide by 45 degrees, and a splitter provided after the rotator and configured to separate the rotated light into components according to directions of polarization of the light, wherein the first spot size converter and the second spot size converter are coupled directly to each other on a wafer.

12 Claims, 9 Drawing Sheets

(56) References Cited

U.S. PATENT DOCUMENTS

2005/0179980 A1* 8/2005 Iwatsuka .............. G02F 1/09
359/280
2011/0243494 A1 10/2011 Hasegawa et al.

FOREIGN PATENT DOCUMENTS

| JP | 2006-323210 | 11/2006 |
| JP | 2007-293211 | 11/2007 |
| JP | 2010-088110 | 4/2010 |
| JP | 2011-107384 | 6/2011 |
| JP | 2011-165712 | 8/2011 |

OTHER PUBLICATIONS

Yamada et al., Polarization-independent Ultrasmall Silicon Photonic Circuits', NTT Gijutsu Journal, 2009, pp. 16 to 19, [online], [retrieval date Feb. 7, 2013], Internet <URL:http://163.137.191.238/journal/0912/files/jn200912016.pdf> (4 pages).

International Search Report, mailed in connection with PCT/JP2013/050817 and mailed Feb. 19, 2013.

Written Opinion of the International Searching Authority, mailed in connection with PCT/JP2013/050817 and mailed on Feb. 19, 2013.

* cited by examiner

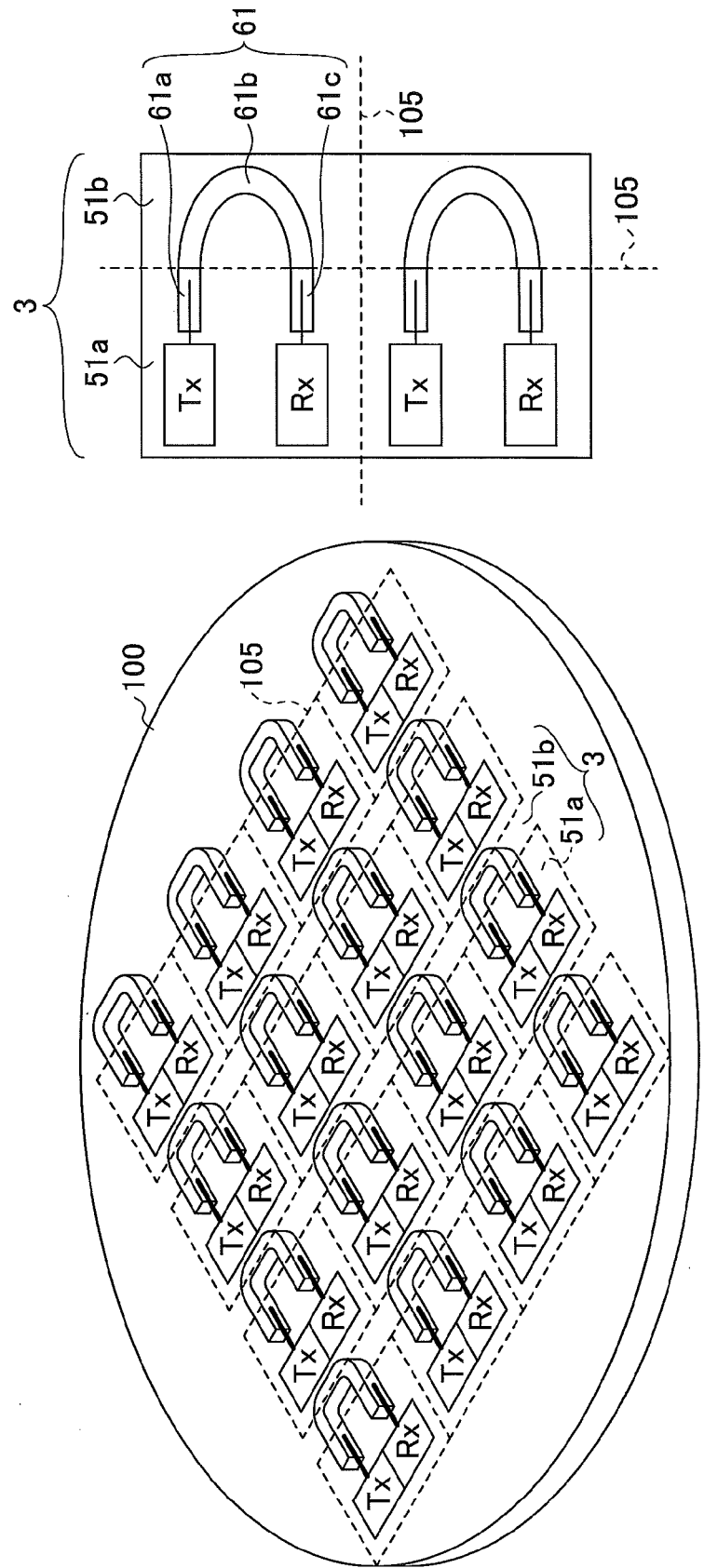

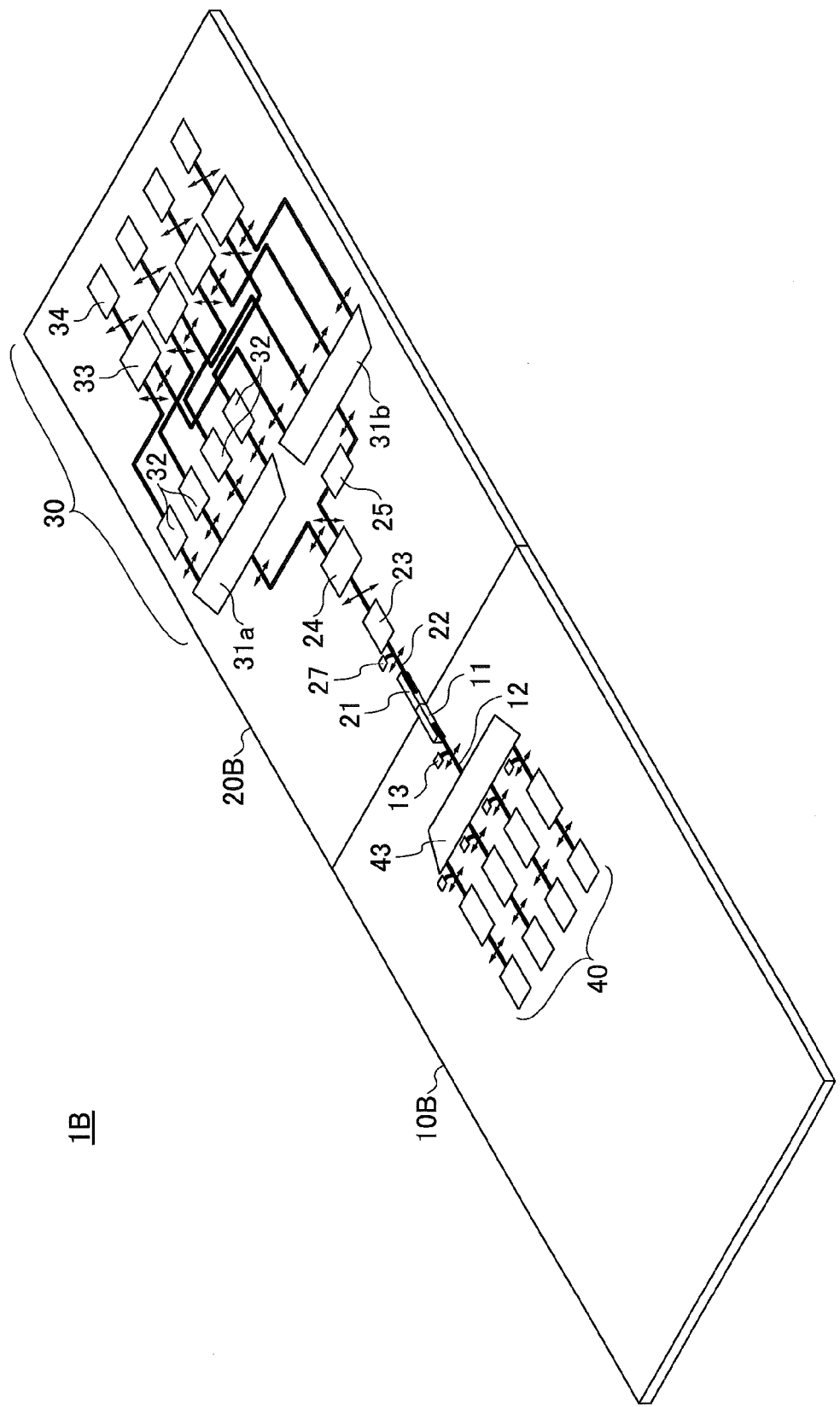

FIG.9

| | | Rx 80A DEFECTIVE | Rx 80B DEFECTIVE | Tx 70A DEFECTIVE | Tx 70B DEFECTIVE | |
|---|---|---|---|---|---|---|
| Tx 70A→Rx 80A | ○ | × | ○ | ○ | ○ | × |
| Tx 70A→Rx 80B | ○ | ○ | × | × | ○ | × |
| Tx 70B→Rx 80A | ○ | × | ○ | ○ | × | × |
| Tx 70B→Rx 80B | ○ | ○ | × | ○ | × | × |
| JUDGMENT | All Non-DEFECTIVE | Rx 80A DEFECTIVE | Rx 80B DEFECTIVE | Tx 70A DEFECTIVE | Tx 70B DEFECTIVE | N/A |

OPTICALLY INTERCONNECTED CHIP, METHOD OF TESTING THE SAME, AND OPTICAL RECEIVER

CROSS-REFERENCE TO RELATED APPLICATIONS

This application is a continuation application filed under 35 U.S.C. 111(a) claiming benefit of priority of PCT International Application No. PCT/JP2013/050817 filed Jan. 17, 2013 and designating the United States, which is incorporated herein by references in its entirety.

FIELD

The disclosures herein relate to an optically interconnected chip, a method of testing the same, and an optical receiver.

BACKGROUND

For high-speed and large capacity data transmission, optical communication has been put into practical applications in the backbone of long-distance communications networks. Optical communication has also been applied to the field of information processing systems including computers or servers for connecting equipment. Introducing optical signals inside equipment or boards is now being pictured.

Meanwhile, silicon photonics, a technique for fabricating minute optical circuits using silicon is attracting attention. Silicon is transparent to infrared light and has a large index of refraction (about 3.5). Fine processed products are easily mass-produced using a semiconductor fabrication process. Making use of the large index of refraction of silicon, light is confined in a silicon wire waveguide. An optical transceiver and a wavelength multiplexer/demultiplexer are integrated in a chip of several millimeters square in fabrication of a wavelength division multiplexing (WDM) transceiver.

Silicon photonics allows a number of chips to be fabricated on a wafer at a time, as per in a semiconductor process. If optical chips are mass-produced, quality check is needed for these chips. In the ordinary semiconductor process, wafer testing is carried out to inspect the chips and only those chips with satisfactory qualities are selected. It is efficient for silicon photonics to employ the same approach for chip inspection.

In the semiconductor process, an electric probe is made to touch an electric terminal of the chip to test the performance. In silicon photonics, a test light has to be input to and output from a chip fabricated on the wafer. In order to take the light from the silicon wire waveguide on the wafer, two approaches are knows. One technique is to use a spot size converter (SSC). See, for example, T, Watanabe, et al, "Si wire waveguide devices", Proceedings of SPIE, Vol. 6775, 67750K (September 2007). The other technique is to use a grating coupler (GC). See, for example, Japanese Patent Application Laid-open Publication No. 2011-107384 A.

A spot size converter expands the mode field diameter (MFD) of the light propagating through the silicon wire waveguide by providing an inverse-taper core and covering the inverse-taper core with a large core of a second waveguide. However, because the spot size converter is arranged at an edge of the chip to input and output light signals to and from the chip, testing or inspection cannot be performed until the wafer is cut into chips.

With a grating coupler, chip testing can be performed on the wafer because the light with an expanded mode field diameter is reflected upward by the diffraction grating after propagation through the inverse-taper core. However, the emission angle of the light is defined by the wavelength and the pitch of the diffraction grating, and the operative wavelength band is narrow. For this reason, the configuration with a grating coupler is unsuitable for WDM with a wide wavelength band. Besides, a single mode optical fiber (SMF) has to be aligned to the grating coupler for testing the chip to an accuracy of micrometers. It is impractical to inspect a number of chips on the wafer using the grating coupler configuration. Another problem in this approach is large polarization dependence.

As yet another approach, a structure for rotating the direction of polarization of light in the optical waveguide is known. See, for example, Japanese Patent Application Laid-open Publication No. 2010-88110 A.

Optical waveguides used in fiber-optic communication are generally designed such that transverse electric (TE) mode and transverse magnetic (TM) mode make as little difference as possible. However, in silicon photonics, the difference between the TE mode and the TM mode becomes conspicuous because light is confined in a microscopic core. Accordingly, silicon photonic wire waveguides are designed so as to operate with only one of the polarized states (generally, in the TE mode).

As long as an optical circuit is closed in a silicon photonic chip, polarization does not become a serious problem. However, when the silicon photonic optical circuit is connected to light signals input from or output to an optical fiber, the polarization issue arises. In an ordinary single-mode optical fiber (SMF), the polarization state of the propagating light is not maintained and both the TE mode and the TM mode exist in the incident light from the SMF on a silicon photonic chip. The TE component and the TM component are separated using a polarization diversity scheme, and the respective polarization states are treated separately.

A polarization-maintaining optical fiber (PMF) is able to maintain the TE-to-TM ratio. By connecting a silicon photonic chip to another silicon photonic chip using a PMF, only TE-polarized light can be received at the receiving end. In order to realize this, the orientation of the polarization axis of the PMF has to be aligned. Specifically, the direction of rotation of the polarization axis is adjusted, while monitoring the microscopic image of the end face of the PMF. This method is complicated and costly, and it is unrealistic.

It is desired to provide a technique for carrying out inspection of optically interconnected chips on a wafer without using a complicated structure, while taking the polarization state of light in an optical fiber into account.

SUMMARY

In one aspect, an optically interconnected chip includes
a first optical transmitter circuit;
a first spot size converter connected by a first optical waveguide to the first optical transmitter circuit;
a first optical receiver circuit;
a second spot size converter connected by a second optical waveguide to the first optical receiver circuit;
a rotator provided between the second spot size converter and the first optical receiver circuit and configured to rotate a direction of polarization of light propagating through the second optical waveguide by 45 degrees; and a splitter provided after the rotator and configured to separate the rotated light into components according to directions of polarization of the light, wherein the first spot size converter and the second spot size converter are coupled directly to each other on a wafer.

The object and advantages of the invention will be realized and attained by means of the elements and combinations particularly pointed out in the claims.

It is to be understood that both the foregoing general description and the following detailed description are exemplary and explanatory and are not restrictive to the invention as claimed.

BRIEF DESCRIPTION OF DRAWINGS

FIG. 5A illustrates another example of chip layout on a wafer;

FIG. 5B is a schematic diagram of the chip layout of FIG. 5A;

FIG. 7 illustrates a modification of the optically interconnected chip of FIG. 3;

FIG. 9 illustrates an example of defective detection results.

DESCRIPTION OF EMBODIMENTS

The embodiments are described below with reference to the attached drawings. In the embodiments, an optically interconnected chip fabricated on a wafer is configured such that the chip can be tested on the wafer. To achieve this, a spot size converter (SSC) of a transmitter and a SSC of a receiver are coupled directly to each other. Immediately after the SSC of the receiver is provided a polarization rotator for rotating the direction of polarization by 45 degrees.

If two adjacent chips, each having a transmitter and a receiver, are to be tested, the SSC of the transmitter of one chip is coupled directly to the SSC of the receiver of the adjacent chip. If a single chip with a transmitter and a receiver is to be tested, the SSC of the transmitter and the SSC of the receiver formed in that chip are coupled directly to each other.

Figure 1:
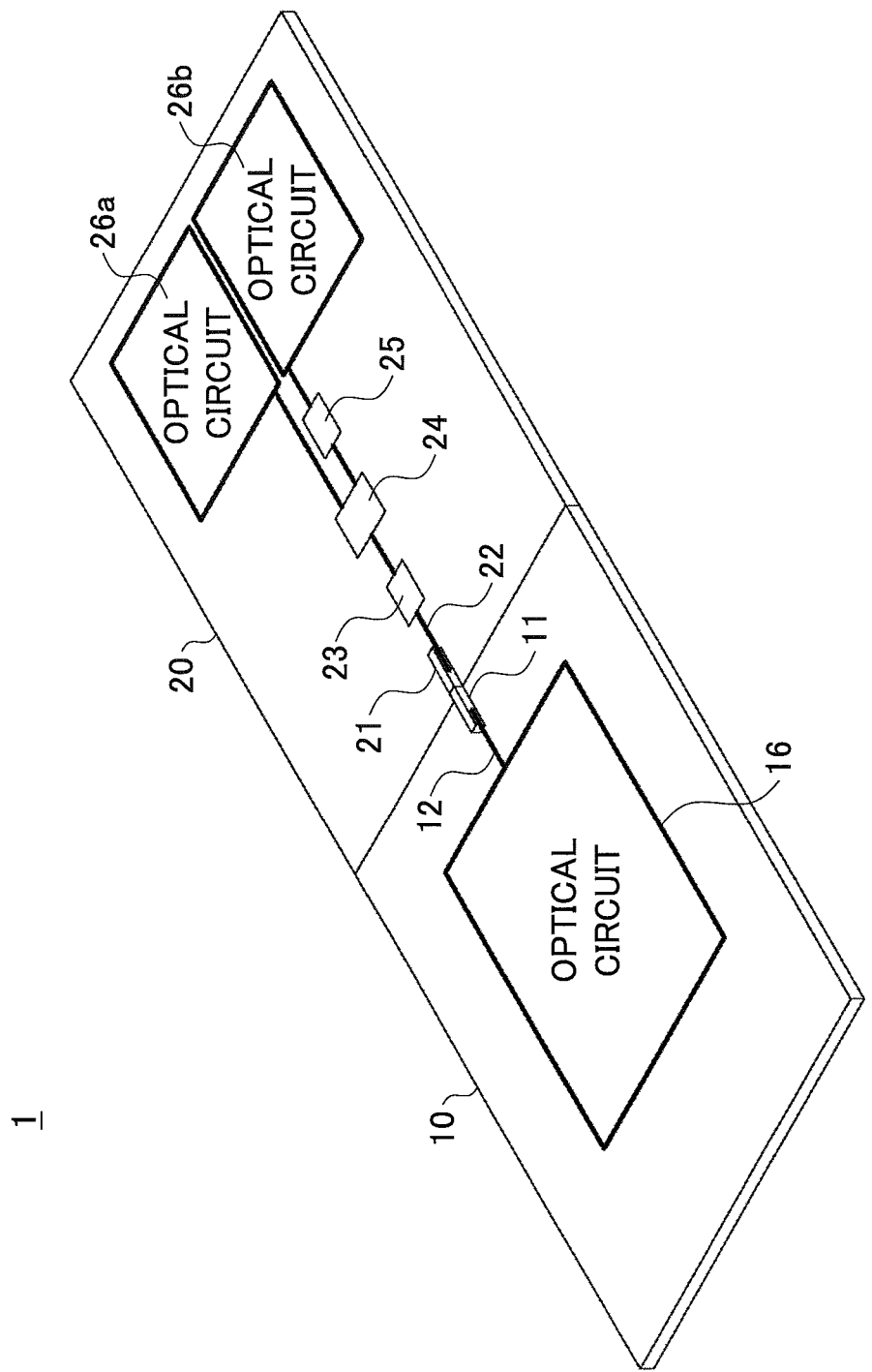
FIG. 1 illustrates a configuration example of an optically interconnected chip according to an embodiment.
Figure 2:
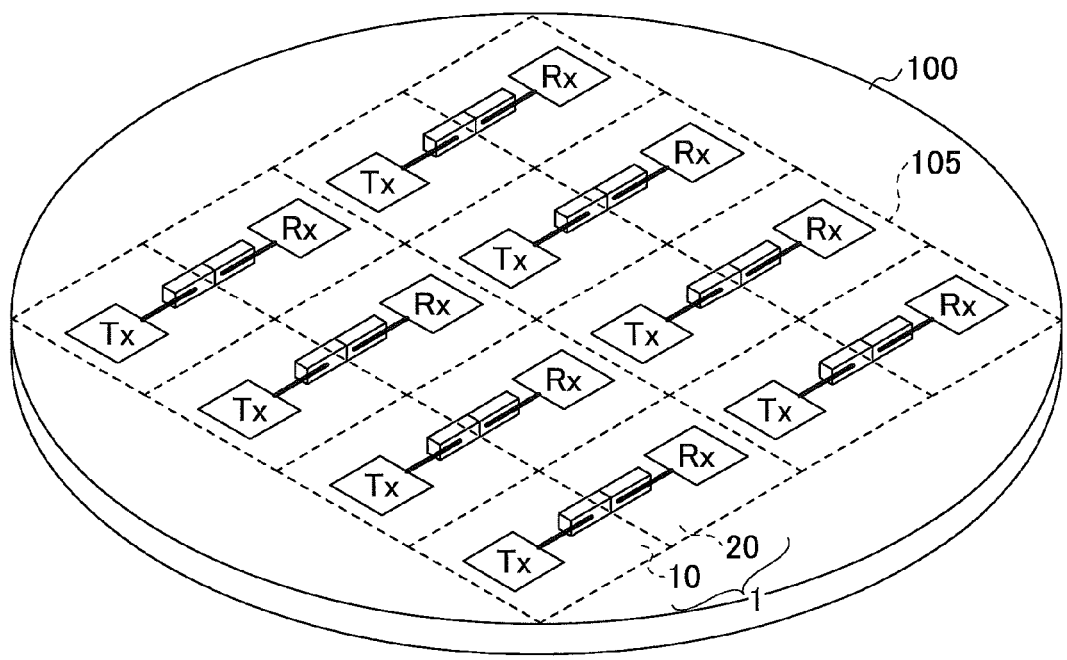
FIG. 2 illustrates a chip layout on a wafer.

FIG. 1 illustrates a configuration example of an optically interconnected chip 1 according to an embodiment. FIG. 2 illustrates an example of chip layout on a wafer 100. In FIG. 2, a number of chip areas are provided on the wafer 100 and each chip area is defined by chip boundaries 105. In the arrangement of FIG. 1 and FIG. 2, a transmitter chip 10 and a receiver chip 20 are arranged adjacent to each other in a predetermined direction. The adjacent transmitter chip 10 and the receiver chip 20 frame the optically interconnected chip 1.

As illustrated in FIG. 1, the transmitter chip 10 has a SSC 11, an optical waveguide 12, and an optical circuit (optical transmitter) 16. The optical waveguide 12 is a silicon wire waveguide with a width of 400 nm to 500 nm and a height of 200 nm to 300 nm, for example. The end portion of the optical waveguide 12 at the opposite side of the optical circuit 16 is inversely tapered (i.e., gradually expanded) and connected to the SSC 11.

The receiver chip 20 has a SSC 21, a 45-degree polarization rotator 23 provided immediately after the SSC 21, a polarization splitter 24, a 90-degree polarization rotator 25, and optical circuits 26a and 26b. These components are coupled by an optical waveguide 22. The receiver chip 20 is an optical receiver adapted for polarization diversity in this example. The end portion of the optical waveguide 22 at the opposite side of the optical circuits 26a and 26b is inversely tapered (i.e., gradually expanded) and connected to the SSC 21.

The SSC 11 of the transmitter chip 10 and the SSC 21 of the receiver chip 20 are coupled directly to each other. In this configuration, there is no optical fiber existing between the SSC 11 and the SSC 21, and light of a single mode (e.g., the TE mode) is output from the SSC 11 of the transmitter chip 10. If the light from the transmitter chip 10 is supplied as it is to the optical circuits 26a and 26b of the receiver chip 20, only one of the optical circuits 26a and 26b provided for polarization diversity is tested.

To solve this inconvenience, a 45-degree polarization rotator 23 is provided immediately after the SSC 21 of the optical receiver (i.e., the receiver chip 20) such that the TE component and the TM component are almost equally contained in the propagating light. In this specification and claims, the term "rotation by 45 degrees" or "a 45-degree polarization rotator" does not mean to rotate the plane of polarization exactly 45 degrees, but includes an allowable margin of error. By arranging the 45-degree polarization rotator 23 immediately after the receiver side SSC 21, a performance test can be performed including the polarization diversity function.

After the testing or inspection, the wafer 100 is cut along the chip boundary 105 and into individual transmitter chips 10 and receiver chips 20. The 45-degree rotator 23 remains in the product, namely, the individual receiver chip 20. This does not cause problems, even if the incident light from the SMF with uncertain polarization state is rotated by 45 degrees, as long as polarization diversity correctly functions.

Figure 3:
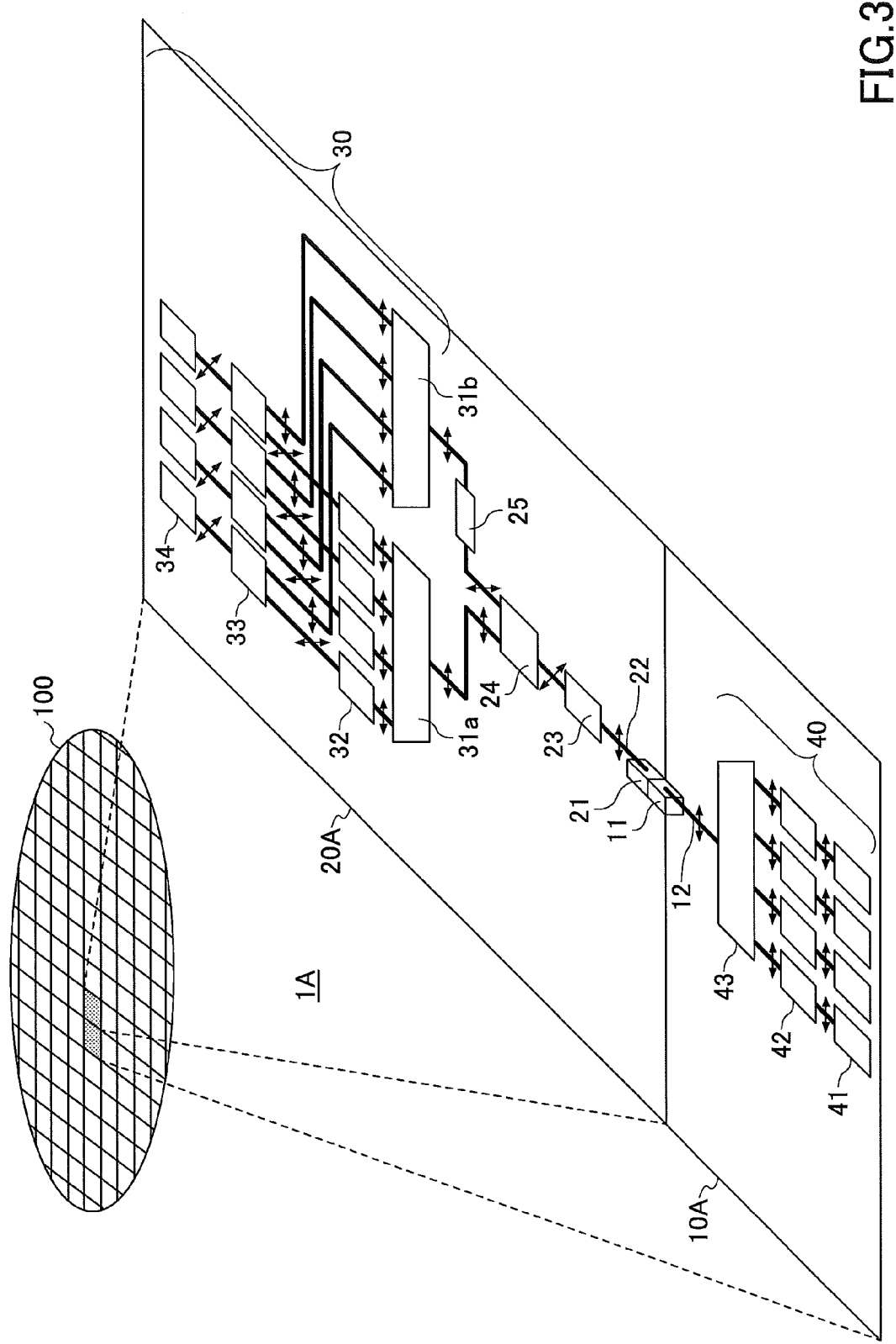
FIG. 3 illustrates a configuration of an optically interconnected chip formed on the wafer.

FIG. 3 illustrates a structure of an optically interconnected chip 1A, in which the configuration of FIG. 1 is applied to a 4-wavelength WDM transceiver. The optically interconnected chip 1A has a transmitter chip 10A and a receiver chip 20A arranged adjacent to each other on the wafer 100.

The transmitter chip 10A has four light sources 41, four optical modulators 42, an optical multiplexer 43, a SSC 11, and an optical waveguide 12 connecting these components. The light sources 41 are, for example, laser diodes (LDs) that emit lights with different wavelengths. The optical modulators 42 modulate the laser lights of the corresponding wavelengths to generate optical signals. The optical multiplexer 43 is, for example, an arrayed waveguide grating (AWG) or a Mach-Zehnder Interferometer (MZI) to multiplex the optical signals. The output of the optical multiplexer 43 is connected to the SSCs by the optical waveguide 12.

The direction of polarization (e.g., the direction of the electric field) of light propagating through the optical waveguide 12 of the transmitter chip 10A is horizontal to the surface of the wafer 100 (in the TE mode) and perpendicular to the light propagation direction, as indicated by the bidirectional arrow.

The receiver chip 20A has a SSC 21, a 45-degree polarization rotator 23 provided immediately after the SSC 21, a polarization splitter 24, a 90-degree polarization rotator 25, and an optical circuit 30.

The light input from the transmitter chip 10A to the receiver chip 20A is incident on the 45-degree polarization rotator 23 through the SSC 21 and the optical waveguide 22. The plane of polarization of the incident light is rotated by 34 degrees at the polarization rotator 23, and a TE component and a TM component are produced. The polarization splitter 24 separates the TE component and the TM component from each other. The TE component is input to an optical demultiplexer 31a and demultiplexed into light components of different wavelengths. The TM component is converted into a TE component by the 90-degree polarization rotator 25. The converted TE component is input to an optical demultiplexer 31b and demultiplexed into light components of different wavelengths.

The output of the optical demultiplexer 31a is converted to a TM component by a 90-degree polarization rotator 32. Each of polarization splitters 33 combines the TM component (originally the TE component) output from the 90-degree polarization rotator 32 and the TE component output from the optical demultiplexer 31b. The combined light is received at each of photodetectors 34. The photodetector 34 includes a light-receiving element such as a photodiode and a transimpedance amplifier (not illustrated) for converting the electric current to an electric voltage with an amplified amplitude, thereby converting the received light signal to an electric voltage signal.

The 45-degree polarization rotator 23 is shaped as a core with a surface slanted at 45 degrees with respect to the wafer surface. By adjusting the length of the slanted surface, the plane of polarization is rotated at an arbitrary angle. The invention is not limited to this example, and any suitable polarization rotator may be employed. By providing the 45-degree polarization rotator 23 immediately after the SSC 21, a light wave containing both the TE and TM components can be produced, simulating the reception of light having been propagating through a single mode optical fiber.

With the configuration illustrated in FIG. 1 and FIG. 3, the performances of the chip can be tested or inspected on the wafer, without using a complicated structure, while taking into account the polarization state of the light input from an optical fiber.

In the testing, driving currents are applied to the light sources (e.g., laser diodes) 41 to cause the light sources 41 to emit continuous wave (CW). Direct currents or modulation signals are supplied to the optical modulators 42. At the receiver end, whether the modulated signals are received at the photo detectors 34 is monitored. The performance of the optically interconnected chip 1A, including the polarization diversity function, can be tested over the wafer simply using a pair of electric probes. The invention is not limited to the testing of an optical chip with a polarization diversity function illustrated in FIG. 3. Other testing items can be added in accordance with pertinent functions and/or performances required for the product.

Such testing is carried out simply by placing the electric probes onto predetermined positions of the transmitter chip 10A and the receiver chip 20A (for example, onto the LD 41 or optical modulator 42, and the photodetector 34). The positioning accuracy of the electric probes can be looser, compared with the positioning accuracy of the optical fiber with respect to the grating coupler.

Figure 4A:
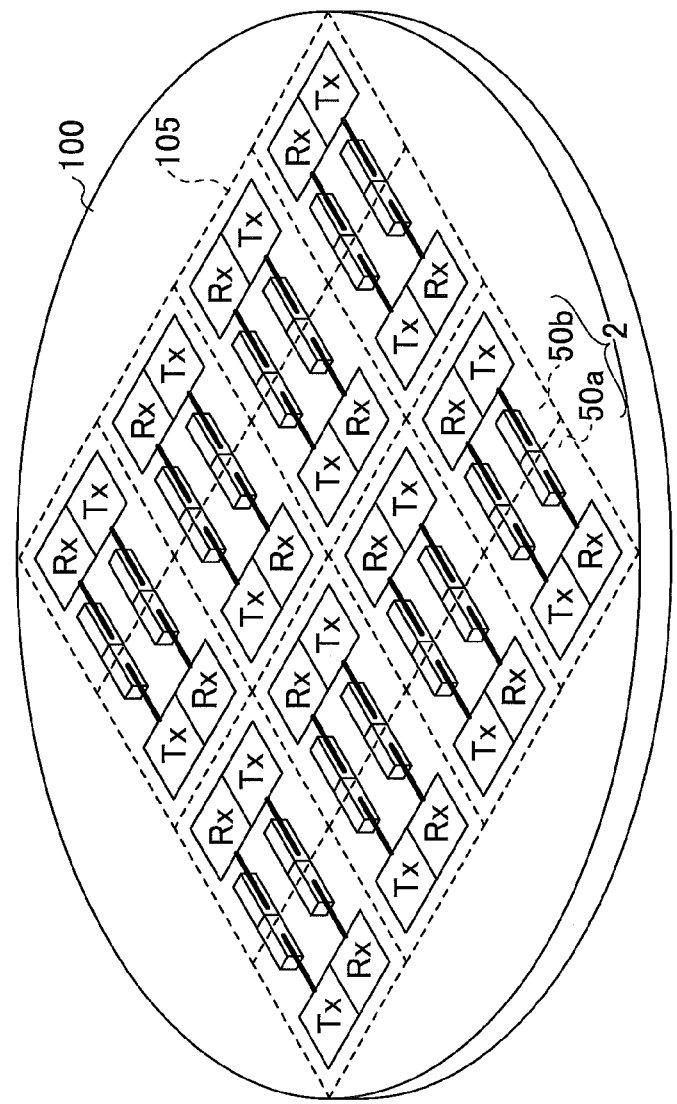
FIG. 4A illustrates an example of chip layout on a wafer.

FIG. 4A through FIG. 6B illustrate examples of chip layout on the wafer 100. In FIG. 4A and FIG. 4B, an optically interconnected chip 2 includes an optical transceiver chip 50a and an optical transceiver chip 50b formed in chip areas adjacent to each other on the wafer 100.

Figure 4B:
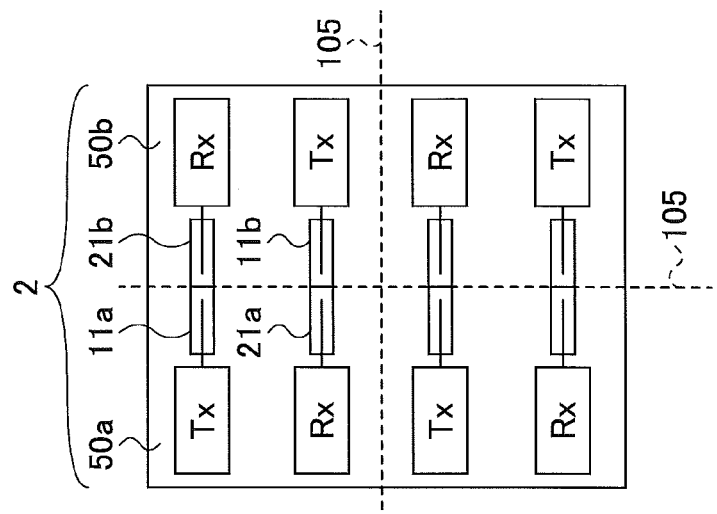
FIG. 4B is a schematic diagram of the chip layout of FIG. 4A.

As illustrated in FIG. 4B, each of the optical transceiver chips 50a and 50b has an optical transmitter circuit Tx and an optical receiver circuit Rx. The optical transmitter circuit Tx and the optical receiver circuit Rx of the optical transceiver 50a, and the optical transmitter circuit Tx and the optical receiver circuit Rx of the optical transceiver 50b are arranged in alternate patterns. The optical transmitter circuit Tx of the optical transceiver chip 50a is connected to the optical receiver circuit Rx of the optical transceiver chip 50b by SSCs 11a and 21b coupled directly to each other. Similarly, the optical receiver circuit Rx of the optical transceiver chip 50a is connected to the optical transmitter circuit Tx of the optical transceiver chip SSCs 21a and 11b.

In testing, electric probes are pressed against the optical transmitter circuit Tx and the optical receiver circuit Rx that are mutually connected via the associated SSCs at predetermined positions. The electric probes are used to determine whether a light signal is correctly transmitted and received. Those chips with satisfactory test results are diced into individual chips 50a and 50b along the chip boundaries 105. The 45-degree polarization rotator 23 (see FIG. 1 and FIG. 3) remains at a position immediately after the SSC 21a (or SSC 21b) in each of the diced chips 50a and 50b. This does not cause problems as long as the polarization diversity is correctly performed, as has been explained above.

FIG. 5A and FIG. 5B illustrate another layout example of an optically interconnected chip 3. In this example, an optical transmitter circuit Tx and an optical receiver circuit Rx are formed in a chip area 51a and connected to each other by a horseshoe-shaped SSC 61. The SSC 61 has a straight portion 61a connected to the optical transmitter circuit Tx, a straight portion 61c connected to the optical receiver circuit Rx, and an arced portion 61b extending between the straight portions 61a and 61c. The arced portion 61b is formed in an area 51b outside the chip area 51a. Although not illustrated in FIG. 5A and FIG. 5B, a 45-degree polarization rotator 23 (see FIG. 1 and FIG. 3) is provided immediately after the straight portion 61c of the SSC 61 on the receiver side.

In testing, electric probes are pressed against the optical transmitter circuit Tx and the optical receiver circuit Rx that are mutually connected via the SSC 61 at predetermined positions. After the testing or inspection, the wafer 100 is diced into individual chips 51a along the chip boundaries 105. By the dicing, the arced portion 61b of the SCC 61 is cut off. In the actual use, optical fibers are connected to the straight portions 61a and 61c of the SCC 61 on the Tx side and the Rx side, respectively.

The area 51b outside the chip area 51a eventually becomes an unnecessary portion. Making use of the area 51b, the SSC 61 that couples the optical transmitter circuit Tx and the optical receiver circuit Rx directly to each other is formed, and each of the optically interconnected chips 3 is tested on the wafer 100.

Figure 6A:
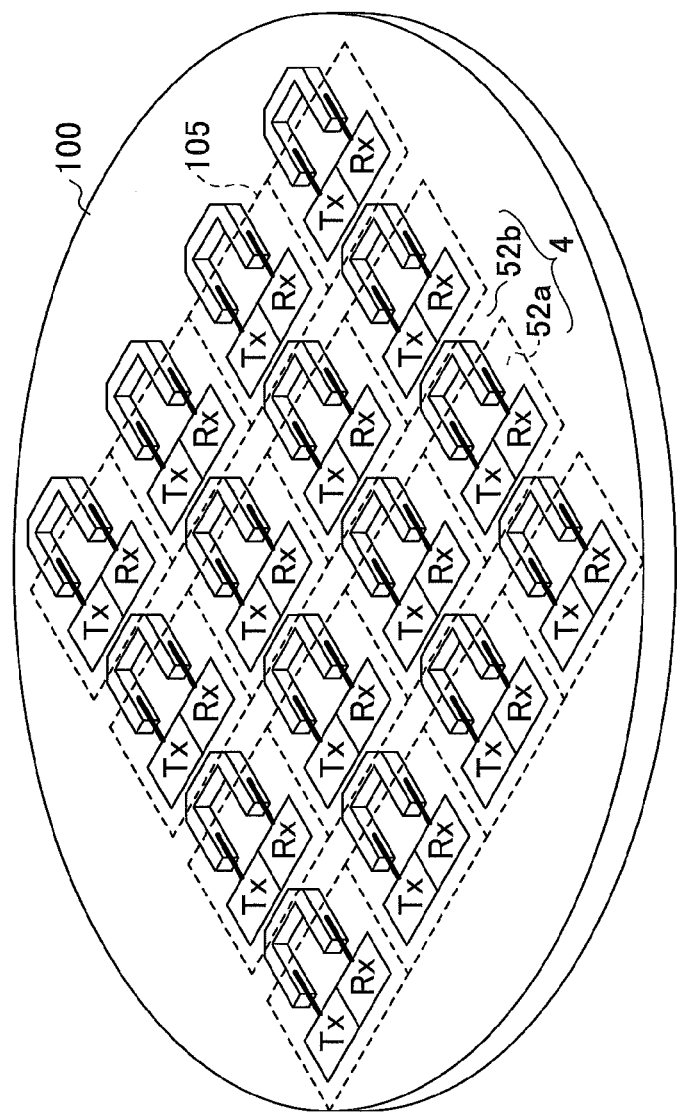
FIG. 6A illustrates still another example of chip layout on a wafer.
Figure 6B:
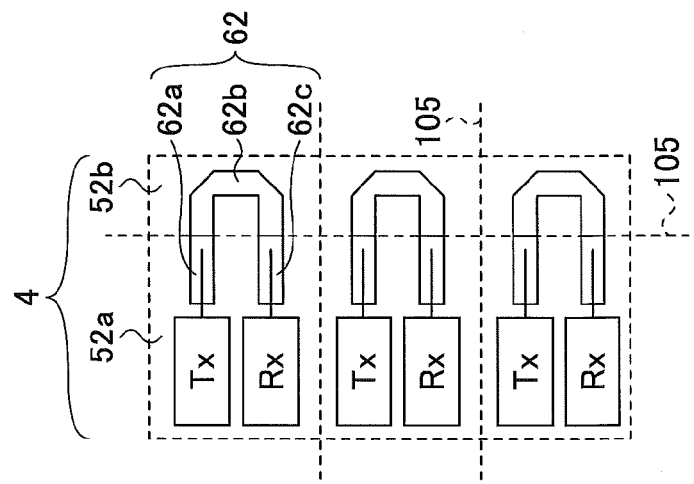
FIG. 6B is a schematic diagram of the chip layout of FIG. 6A.

FIG. 6A and FIG. 6B illustrate still another example of chip layout of an optically interconnected chip 4. In this example, an optical transmitter circuit Tx and an optical receiver circuit Rx are formed in a chip area 52a and connected to each other by a U-shaped SSC 62. The SSC 62 has a straight portion 62a connected to the optical transmitter circuit Tx, a straight portion 62c connected to the optical receiver circuit Rx, and a bent portion 62b extending between the straight portions 62a and 62c. The bent portion 62b is formed in an area 52b outside the chip area 52a.

Although not illustrated in FIG. 6A and FIG. 6B, a 45-degree polarization rotator 23 (see FIG. 1 and FIG. 3) is provided immediately after the straight portion 62c of the SSC 62 on the receiver side.

In testing, electric probes are pressed against the optical transmitter circuit Tx and the optical receiver circuit Rx that are mutually connected via the SSC 62 at predetermined positions. After the testing or inspection, the wafer 100 is diced into individual chips 52a along the chip boundary 105. By the dicing, the bent (or U-shaped) portion 62b of the SCC 62 is cut off. In the actual use, optical fibers are connected to the straight portions 62a and 62c of the SCC 62 on the Tx side and the Rx side, respectively.

FIG. 7 illustrates an optically interconnected chip 1B, which is a modification of the optically interconnected chip 1A of FIG. 3. The optically interconnected chip 1B has a transmitter chip 10B and a receiver chip 20B. The transmitter chip 10B has a monitoring photodiode (PD) 13 branched off from the optical waveguide 12 between the optical multiplexer 43 and the transmitter-side SSC 11. The receiver chip 20B has a monitoring photodiode (PD) 27 branched off from the optical waveguide 22 between the receiver side SSC 21 and the 45-degree polarization rotator 23.

In the configuration of FIG. 3, it may be unknown occasionally which one of the transmitter chip 10A and the receiver chip 20A is defective. To solve this inconvenience, monitor PDs 13 and 27 are provided at appropriate positions on the transmitter chip 10B and the receiver chip 20B. If the test result obtained from the monitor PD 13 of the transmitter chip 10A is satisfactory, and if the test result obtained from the monitor PD 27 of the receiver chip 20B is defective, then it is determined that the receiver chip 20B is defective.

This arrangement is applicable to the examples of chip layout illustrated in FIG. 4A to FIG. 6B. However, if the transmitter chip 10B is defective, determination as to whether the receiver chip 20B is satisfactory cannot be made.

Figure 8:
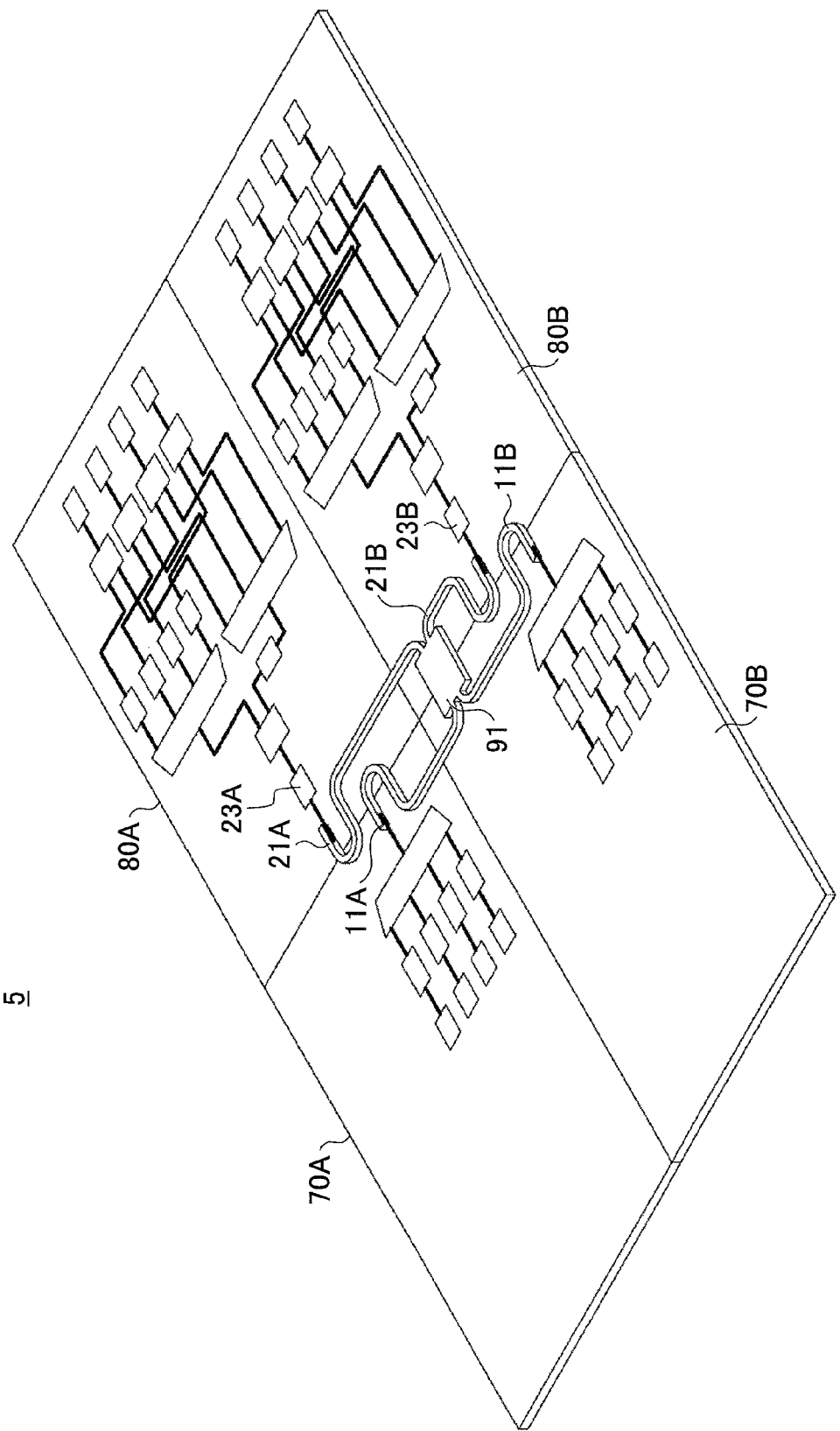
FIG. 8 illustrates another configuration example of an optically interconnected chip.

FIG. 8 illustrates an optically interconnected chip 5 as still another chip configuration. The optically interconnected chip 5 has transmitter chips 70A and 80B, receiver chips 80A and 80B, and an optical distributor 91. The transmitter chip 70A has a transmitter-side SSC 11A, and the transmitter chip 70B has a transmitter-side SSC 11B. The receiver chip 80A has a receiver-side SSC21A and a 45-degree polarization rotator 23A provided immediately after the SSC 21A. The receiver chip 80B has a receiver-side SSC21B and a 45-degree polarization rotator 23B provided immediately after the SSC 21B. Although not illustrated, a monitor PD 13 may be provided at an appropriate position on each of the transmitter chips 70A and 70B, and a monitor PD 27 may be provided at an appropriate position on each of the receiver chips 80A and 80B.

The transmitter side SSCs 11A and 11B are coupled to the optical distributor 91 whose output is distributed to the receiver-side SSCs 21A and 21B. It is preferable that the distribution among the SSCs is even, and the optical distributor 91 is provided at or in the vicinity of the center of the four chips 70A, 70B, 80A and 80B.

The optical distributor 91 may be formed as a branching structure or multi-mode interferometer (MMI). The power level of light received at each of the receiver chip 80A and the receiver chip 80B may be reduced according to the distribution. For this reason, the number of branches distributing light to the receiver-side SSCs is preferably two or three. In the actual optical communications, more significant loss occurs due to an optical fiber or an optical connector between the transmitter chip and the receiver chip. Accordingly, the branching structure or the MMI has an insignificant effect on the decrease in the receive power level.

A light signal output from the transmitter chip 70A is supplied through the transmitter-side SSC 11A to the optical distributor 91 and distributed to the receiver chips 80A and 80B. The light signal distributed to the receiver chip 80A is supplied through the receiver-side SSC 21A to the 45-degree polarization rotator 23A. The 45-degree polarization rotator 23A outputs a signal in which the TE mode component and the TM mode component coexist. Similarly, the light signal distributed to the receiver chip 80B is supplied through the receiver-side SSC 21B to the 45-degree polarization rotator 23B. The 45-degree polarization rotator 23B outputs a signal in which the TE mode component and the TM mode component coexist. By testing the receiving states at the receiver chips 80A and 80B using electric probes, the performances of these chips can be determined.

A light signal output from the transmitter chip 70B is supplied through the transmitter-side SSC 11B to the optical distributor 91 and distributed to the receiver chips 80A and 80B. The light signal distributed to the receiver chip 80A is supplied through the receiver-side SSC 21A to the 45-degree polarization rotator 23A. The 45-degree polarization rotator 23A outputs a signal in which the TE mode component and the TM mode component coexist. Similarly, the light signal distributed to the receiver chip 80B is supplied through the receiver-side SSC 21B to the 45-degree polarization rotator 23B. The 45-degree polarization rotator 23B outputs a signal in which the TE mode component and the TM mode component coexist. By testing the receiving states at the receiver chips 80A and 80B using electric probes, the performances of these chips can be determined.

FIG. 9 illustrates an example of test results performed on the optically interconnected chip 5 of FIG. 8. There are four signal transmission paths, from the transmitter chip 70A to the receiver chip 80A, from the transmitter chip 70A to the receiver chip 80B, from the transmitter chip 70B to the receiver chip 80A, and from the transmitter chip 70B to the receiver chip 80B, in the configuration of FIG. 8. If signals are appropriately received on all of the four paths, then it is determined that all of the four chips 70A, 70B, 80A and 80B are satisfactory (non-defective).

If the receiver chip 80A does not receive a signal, and nevertheless the signals from the transmitter chips 70A and 70B are appropriately received at the receiver chip 80B, then it is determined that the receiver chip 80A is defective. Conversely, if the receiver chip 80BA does not receive a signal, and nevertheless the signals from the transmitter chips 70A and 70B are appropriately received at the receiver chip 80A, then it is determined that the receiver chip 80B is defective.

If neither the receiver chip 80A nor the receiver chip 80B receives the signal from the transmitter chip 70A, and nevertheless the signal from the transmitter chip 70B is appropriately received at both the receiver chip 80A and the receiver chip 80B, then it is determined that the transmitter chip 70A is defective. If neither the receiver chip 80A nor the receiver chip 80B receive the signal from the transmitter chip 70B, and nevertheless the signal from the transmitter chip 70A is appropriately received at both the receiver chip 80A and the receiver chip 80B, then it is determined that the transmitter chip 70B is defective.

If no signals are received at any of the four paths, the position at which the defect or problem arises cannot be identified (at the rightmost column in FIG. 9). However, this is a rare case because there is little likelihood that a problem occurs at the same parts of multiple chips.

With the above-described structure or method, the performance of chips including the polarization diversity function can be tested simply using electronic probes, and the throughput of the chip test or investigation is improved. Especially, a number of chips can be checked efficiently on a wafer. Because SSCs are provided on the chip, the structure is suitably applied to optical transmission of the wavelength division multiplexing scheme. Because the transmitting and receiving functions required for the optical transmission test are already provided on the chips formed on the wafer, a special test tool or device is unnecessary.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

The invention claimed is:

1. An optically interconnected chip comprising:
   a first optical transmitter circuit;
   a first spot size converter connected by a first optical waveguide to the first optical transmitter circuit;
   a first optical receiver circuit;
   a second spot size converter connected by a second optical waveguide to the first optical receiver circuit;
   a rotator provided between the second spot size converter and the first optical receiver circuit and configured to rotate a direction of polarization of light propagating through the second optical waveguide by 45 degrees; and
   a splitter provided after the rotator and configured to separate the rotated light into components according to directions of polarization of the light,
   wherein the first spot size converter and the second spot size converter are coupled directly to each other on a wafer.

2. The optically interconnected chip according to claim 1, wherein the first optical transmitter circuit and the first optical receiver circuit are arranged in chip areas located adjacent to each other on the wafer, and
   wherein the first spot size converter and the second spot size converter are coupled to each other at a boundary between the adjacent chip areas.

3. The optically interconnected chip according to claim 2, further comprising:
   a second optical receiver circuit arranged in a first chip area of the adjacent chip areas in which the first optical transmitter circuit is provided;
   a third spot size converter connected to the second optical receiver circuit;
   a second optical transmitter circuit arranged in a second chip area of the adjacent chip areas in which the first optical receiver circuit is provided; and
   a fourth spot size converter connected to the second optical transmitter circuit,
   wherein the third spot size converter and the fourth spot size converter are coupled directly to each other at a boundary between the first chip area and the second chip area.

4. The optically interconnected chip according to claim 1,
   wherein the first transmitter circuit and the first receiver circuit are arranged in a same chip area on the wafer, and
   wherein the first spot size converter and the second spot size converter are coupled directly to each other outsize the chip area.

5. The optically interconnected chip according to claim 4, wherein the first spot size converter and the second spot size converter are coupled directly to each other at a horseshoe-shaped portion located outside the chip area.

6. The optically interconnected chip according to claim 4, wherein the first spot size converter and the second spot size converter are coupled directly to each other at a U-shaped portion located outside the chip area.

7. The optically interconnected chip according to claim 1, further comprising:
   two or more of the first optical transmitter circuits,
   two or more of the first spot size converters, each connected to one of the first optical transmitter circuits;
   two or more of the first optical receiver circuits;
   two or more of the second spot size converters, each connected to one of the first optical receiver circuits; and
   an optical distributor connected to the first spot size converters and the second spot size converters.

8. The optically interconnected chip according to claim 1, further comprising:
   a first monitoring photodetector provided branching off from the first optical waveguide; and
   a second monitoring photodetector provided branching off from the second optical waveguide.

9. A optical receiver comprising:
   a optical receiver circuit;
   a spot size converter connected by an optical waveguide to the optical receiver circuit;
   a rotator provided between the spot size converter and the optical receiver circuit and configured to rotate a direction of polarization of light propagating through the optical waveguide by 45 degrees; and
   a splitter provided between the rotator and the optical receiver circuit and configured to separate the light being guided to the optical receiver circuit into components according to directions of polarization.

10. A method of testing an optically interconnected chip, comprising:
    forming an optically interconnected chip on a wafer, the optically interconnected chip having an optical transmitter circuit, a first optical waveguide extending from the optical transmitter circuit, an optical receiver circuit, a second optical waveguide extending from the optical receiver circuit, a spot size converter connecting the first optical waveguide and the second optical waveguide, and a rotator located on the second optical waveguide and configured to rotate a direction of polarization of light propagating through the second optical waveguide;
    inputting a light signal from the optical transmitter circuit to the optical receiver circuit through the spot size converter on the wafer; and
    testing a performance of the optically interconnected chip on the wafer by detecting a transmission state and a reception state of the light signal.

11. The method according to claim 10, further comprising:
- providing a first monitoring photodetector on the wafer at a position branching off from the first optical waveguide;
- providing a second monitoring photodetector on the waver at a position branching off from the second optical waveguide; and
- determining a performance of the optically interconnected chip using monitoring results of the first monitoring photodetector and the second monitoring photodetector.

12. The method according to claim 10, further comprising:
- forming two or more of the optical transmitter circuits, two or more first spot size converters, each connected to one of the optical transmitter circuits, two or more of the optical receiver circuits, and two or more second spot size converters, each connected to one of the optical receiver circuits, and an optical distributor connected to the first spot size converters and the second spot size converters on the wafer;
- inputting the light signal from one of the optical transmitter circuits and supplying the light signal via the optical distributor to the optical receiver circuits; and
- determining the performance of the optically interconnected chip based upon the transmission state and the reception states at each of the optical receiver circuits.

* * * * *